(12) United States Patent
Rewinkel

(10) Patent No.: US 7,468,895 B1
(45) Date of Patent: Dec. 23, 2008

(54) METHOD AND SYSTEM FOR PROVIDING A BIAS VOLTAGE FOR A POWER INPUT SUB-CIRCUIT OF A SWITCHED MODE POWER SUPPLY

(75) Inventor: Wayne Rewinkel, Scottsdale, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 150 days.

(21) Appl. No.: 10/779,220

(22) Filed: Feb. 13, 2004

(51) Int. Cl.
*H02M 3/335* (2006.01)
*G02B 27/00* (2006.01)
(52) U.S. Cl. .................... 363/21.15; 323/902; 250/551
(58) Field of Classification Search ............. 363/21.07, 363/21.15, 21.17; 323/902; 327/488, 486, 327/491, 489; 250/551, 205
See application file for complete search history.

(56) References Cited

U.S. PATENT DOCUMENTS

| | | | | |
|---|---|---|---|---|
| 5,757,627 A | * | 5/1998 | Faulk | 363/21.14 |
| 5,982,639 A | * | 11/1999 | Balakirshnan | 363/21.18 |
| 6,134,123 A | * | 10/2000 | Yamada | 363/21.13 |
| 6,226,190 B1 | * | 5/2001 | Balakrishnan et al. | 363/21.13 |
| 6,366,481 B1 | * | 4/2002 | Balakrishnan et al. | 363/21.15 |
| 6,396,718 B1 | * | 5/2002 | Ng et al. | 363/21.07 |
| 6,519,165 B2 | * | 2/2003 | Koike | 363/21.12 |
| 6,756,601 B2 | * | 6/2004 | Dodson, III | 250/551 |
| 6,885,016 B2 | * | 4/2005 | Worley et al. | 250/551 |

* cited by examiner

*Primary Examiner*—Jeffrey L. Sterrett
*Assistant Examiner*—Harry Behm

(57) ABSTRACT

A switched mode power supply (SMPS) is disclosed. The switched mode power supply (SMPS) includes a controller sub-circuit that generates an output signal that drives a switch. The controller sub-circuit generates a bias voltage without using a bias regulator for a sub-circuit of the switched mode power supply that is different from the controller sub-circuit when the controller sub-circuit is coupled to the sub-circuit of the switched mode power supply.

12 Claims, 11 Drawing Sheets

METHOD AND SYSTEM FOR PROVIDING A BIAS VOLTAGE FOR A POWER INPUT SUB-CIRCUIT OF A SWITCHED MODE POWER SUPPLY

FIELD OF THE INVENTION

The present invention relates generally to power supplies. In particular, an embodiment of the present invention relates to switched mode power supplies (SMPSS).

BACKGROUND OF THE INVENTION

A power supply is device that transfers power to a load to which the power supply is coupled wherein the power that is delivered has characteristics required by the load. Typically the power supply is coupled to a primary power source that has characteristics that are incompatible with the load to which it is coupled. The power supply makes the load compatible with its power source. A power supply is sometimes called a power converter and the process of delivering power from primary power source to load is termed "power conversion."

Moreover, a power supply is a device that converts available power that has one set of characteristics to power that has another set of characteristics in order to meet specified load requirements. Typical applications of power supplies include the conversion of raw input power to controlled or stabilized voltage and/or current for the operation of electronic equipment.

A switched mode power supply is a power supply that provides the power supply function through low loss components such as capacitors, inductors, and transformers and the use of switches that assume one of two states (e.g., "on" or "off"). The advantage is that the switches dissipate very little power in either of these two states and power conversion can be accomplished with minimal power loss (which equates to high efficiency).

FIGS. 1 and 2 show conventional switched mode power supplies. FIG. 1 shows the circuit architecture employed when an op-amp is used as the circuit error amplifier, and FIG. 2 shows the circuit architecture employed when a GM amplifier is used as the circuit error amplifier. In the architectures shown in FIGS. 1 and 2 an opto-coupler is used in the feedback loop to avoid DC coupling between the input and the output stages of the device. These designs feature the use of voltage bias regulators and voltage bias resistors that have the effect of limiting the bandwidth of the circuit.

It should be appreciated that low bandwidth circuits such as these can cause the overall performance of the converter to be unstable. Such devices can require substantial and tedious bench testing from highly skilled personnel in order to stabilize the devices. In addition, conventional switched mode power supplies such as those shown in FIGS. 1 and 2 feature a significant parts count. In high volume applications the cost of producing such power supplies can be a competitive disadvantage. Moreover, the performance uncertainties that accompany their design contributes to time to market delays that places the manufacturers of such devices at a competitive disadvantage.

SUMMARY OF THE INVENTION

Accordingly, a need exists for a switched mode power supply that has a reduced parts count. The present invention provides a method and system that accomplishes this need.

According to one embodiment, a switched mode power supply (SMPS) is disclosed. The switched mode power supply (SMPS) includes a controller sub-circuit that generates an output signal that drives a switch. The controller sub-circuit generates a bias voltage for a sub-circuit of the switched mode power supply that is different from the controller sub-circuit when the controller sub-circuit is coupled to the sub-circuit of the switched mode power supply.

In another embodiment, a switched mode power supply (SMPS) is disclosed. The switched mode power supply (SMPS) includes a power input sub-circuit. A controller sub-circuit is coupled to the power input sub-circuit and generates an output signal. A power output sub-circuit is coupled to the controller sub-circuit. The controller sub-circuit generates a bias voltage for a component of the power input sub-circuit of the switched mode power supply when the controller sub-circuit is coupled to the component of the power input sub-circuit.

In yet another embodiment, in a switched mode power supply, a method for providing a bias voltage for a power input sub-circuit of said switched mode power supply is disclosed. The method includes receiving an input voltage into a power input sub-circuit of the switched mode power supply circuit and generating a bias voltage from a controller sub-circuit of the switched mode power supply that is applied to a terminal of the power input sub-circuit. An output voltage is generated.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 3:
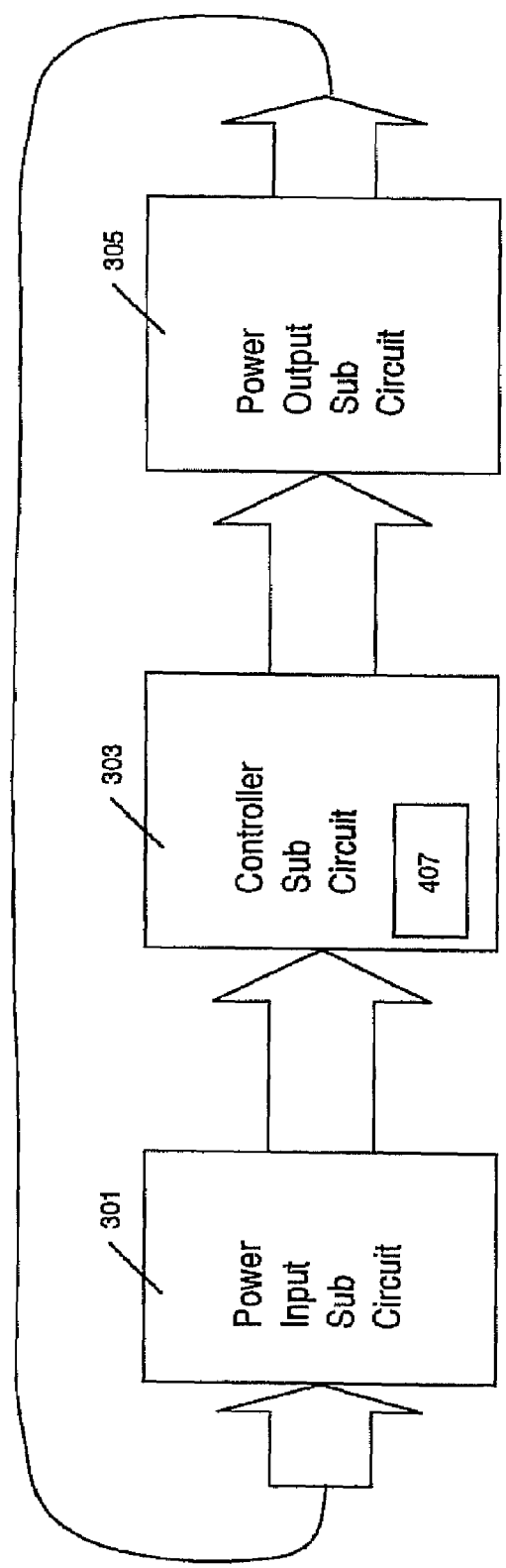
FIG. 3 shows an SMPS control system that employs an opto-coupler interface to a power input sub-circuit according to one embodiment of the present invention.

Exemplary System for Providing a Bias Voltage for a Power Input Sub-Circuit of a Switched Mode Power Supply in Accordance with Embodiments of the Invention FIG. 3 shows a switched mode power supply (SMPS) control system that employs an opto-coupler interface to a power input sub-circuit according to one embodiment of the present invention. The opto-coupler interface that is employed generates a bias voltage for an opto-coupler resident in the power input sub-circuit of the SMPS that eliminates the necessity of providing the bias voltage through the use of additional external parts. FIG. 3 shows power input sub-circuit 301, controller sub-circuit 303, and power output sub-circuit 305.

Power input sub-circuit 301 receives an input voltage and supplies a voltage to controller sub-circuit 303. According to one embodiment, the power input sub-circuit may include an opto-coupler. The voltage that is received by the opto-coupler may move high or low. Where the magnitude of the voltage received by the opto-coupler is high a current of high magnitude is supplied to controller sub-circuit 303. Where the magnitude of the voltage received by the opto-coupler is low a current of low magnitude is supplied to the controller sub-circuit 303.

The controller sub-circuit 303 receives current supplied from the power input sub-circuit 301. The magnitude of the current received by the controller sub-circuit 303 from the power input sub-circuit 301 determines the duty cycle of the controller sub-circuit 303 output. In the present embodiment, controller sub-circuit 303 includes an opto-coupler interface 407 to power input sub-circuit 303. According to one embodiment, the opto-coupler interface 407 may be implemented using a cascode transistor (see FIG. 4A). According to such embodiments, the cascode transistor may be situated so as to provide a common base cascode interface for an opto-transistor in the power input sub-circuit 301. The controller sub-circuit 303 supplies a switch driving signal to power output sub-circuit 305 that has a duty cycle that corresponds to the magnitude of the current that is supplied by the power input sub-circuit 303 opto-coupler.

Power output sub-circuit 305 receives a switching signal from controller sub-circuit 303 and generates a switching signal therefrom. According to one embodiment, the power output sub-circuit 305 may include a transformer that provides power stage isolation. It should be appreciated that power output sub-circuit 305 is a part of a feedback/control loop. The power output sub-circuit 305 provides a feedback/control signal/voltage to the input terminal of power output sub-circuit 301.

According to one embodiment, employing an added opto-coupler interface to an SMPS control IC that includes an opto-coupler improves the bandwidth of the opto-coupler and reduces the external parts needed when an opto-coupler is used. In addition, the opto-coupler interface allows the IC to function without the opto-coupler but with feedback resistors if it is used in a non-isolated design, and works with either error amplifier type (GM or op amp). Moreover, the opto-coupler interface uses no additional IC package pins.

Figure 1:
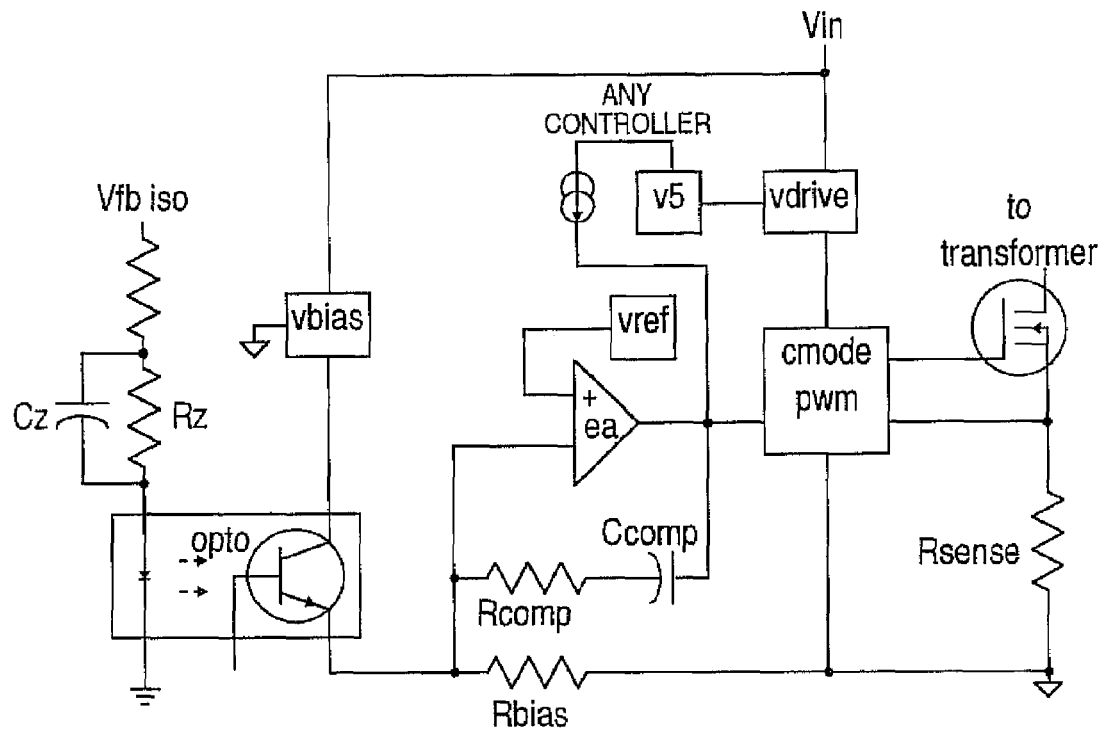
FIG. 1 shows a conventional switched mode power supply.
Figure 2:
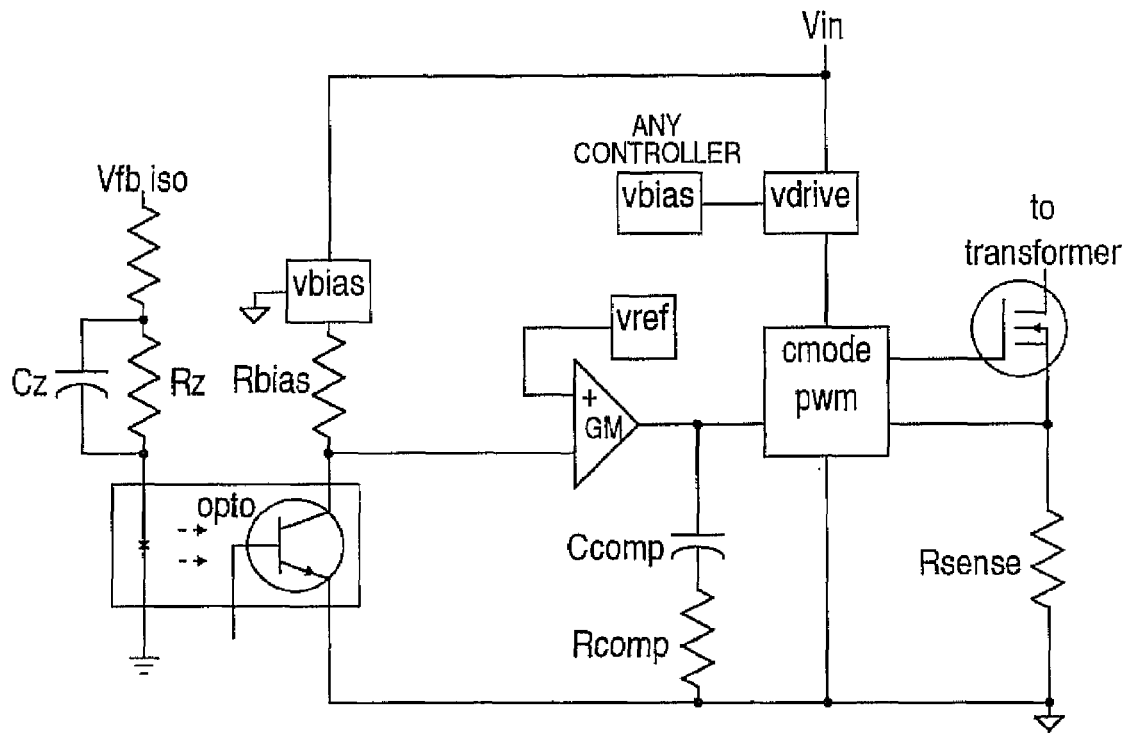
FIG. 2 shows conventional switched mode power supply.
Figure 4A:
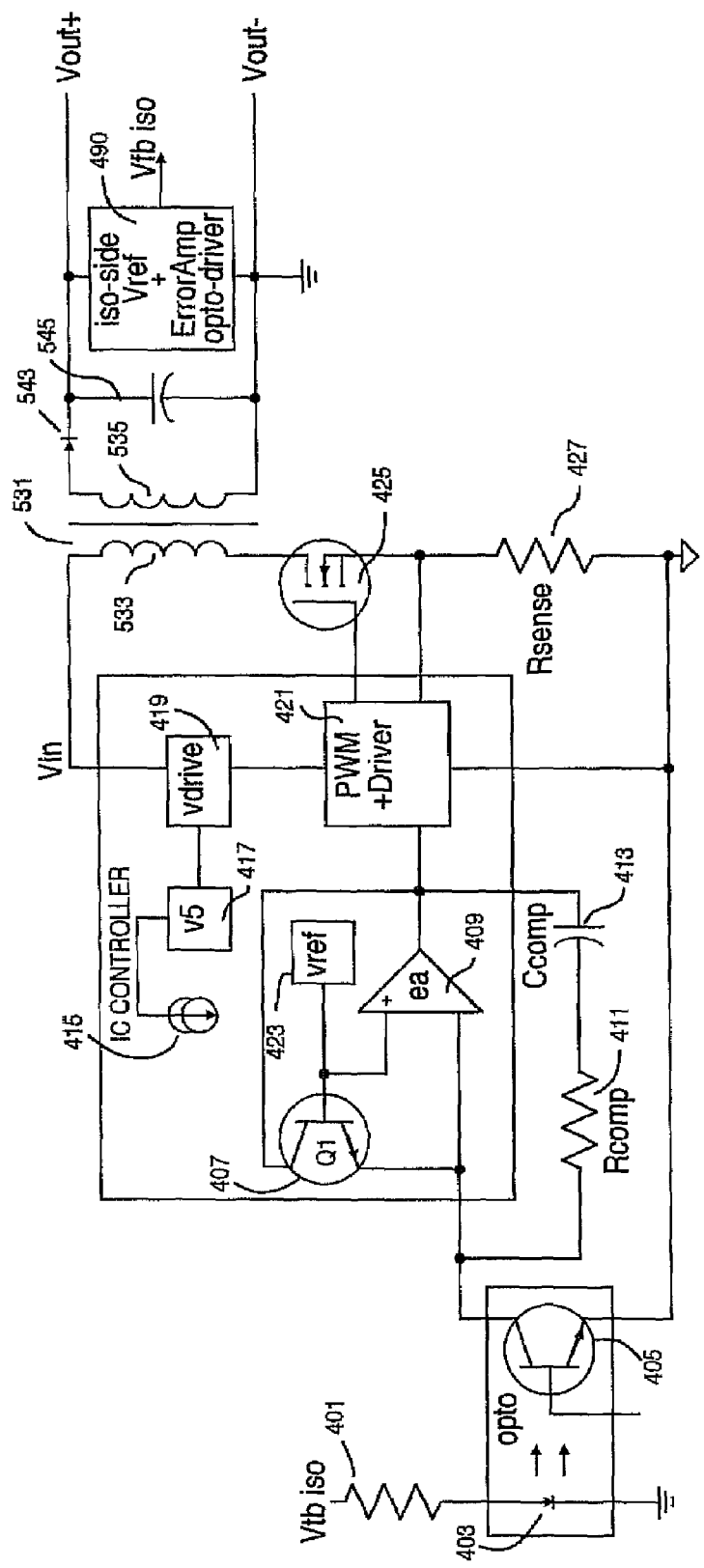
FIG. 4A shows an implementation of an SMPS control system that employs an opto-coupler interface according to one embodiment of the present invention.

These goals are achieved by adding one npn transistor as shown in FIG. 4A below. Its placement provides a common base cascode interface for the opto transistor. The cascode transistors emitter is a low impedance connection, thus, the Miller capacitance of the opto npn is greatly reduced and bandwidth becomes a simple function of the effective capacitance and resistance at the error amplified output. The pole introduced by the opto-coupler is moved to a frequency 5 to 20 times higher than would be possible with the opto-coupler collector connected to the error amplifier output as is done conventionally in the example shown in FIG. 2.

According to one embodiment, external parts count is reduced since no Vbias supply or bias resistors are needed to bias the opto-coupler and the opto diode drive need not contain an additional parallel resistor and capacitor to provide a zero to cancel the opto induced pole.

According to one embodiment, when a non isolated design is employed, the opto is replaced with two feedback resistors. With the control loop closed, the base emitter junction of Q1 (see FIG. 4A at 407) is biased at nearly zero volts so it remains off and allows the error amplifier to function as if it was not present. When the opto interface is connected as shown in FIG. 4A, the error amplifier's negative input voltage is one diode drop below Vref so a GM error amp will source its maximum current into Q1 (see FIG. 4A at 407). If the error amp is an op-amp, it can be designed with a limited current sourcing capability as is easily accomplished if it possesses a class A output stage.

It should be appreciated that no pins need be added to the IC to implement the embodiments of the present invention and compared to some conventional schemes pins can be removed. The error amp cascode interface can also provide a simple shutdown function by sinking sufficient current from the error amplifier input to saturate Q1 (see FIG. 4A at 407).

FIG. 4A shows an implementation of an SMPS control system that employs an opto-coupler interface and a low impedance error amplifier according to one embodiment of the present invention. The discussion that follows describes the operation the exemplary SMPS control system of FIG. 4A that employs an opto-coupler interface in accordance with one embodiment of the present invention.

In the present embodiment, opto-coupler npn-transistor 405 is biased through the operation of cascode transistor 407. As a result, the external parts count is reduced since no Vbias supply or bias resistors are needed to bias the opto-coupler and the opto diode drive need not contain an additional parallel resistor and capacitor to provide a zero to cancel the opto induced pole.

Referring to FIG. 4A, when the voltage present at Vfb Iso moves high (e.g., higher than it was previously), it causes increased current to flow through opto-diode 403. The increased current flow through opto-diode 403 causes increased current flow in opto-coupler npn transistor 405 to which it is coupled. It should be appreciated that the increased flow of current through opto-coupler transistor 405 causes a corresponding increase of current flow in cascode transistor 407. In the embodiment shown in FIG. 4A, as current flow increases through cascode transistor 407, the voltage at the collector of cascode transistor 407 decreases.

The decreasing voltage at the collector of cascode transistor 407 causes the voltage supplied to pulse width modulator (PWM) driver 421 to decrease which in turn causes the duty cycle of the switching signal driving FET 425 to decrease. It should be appreciated that a decreasing duty cycle of the signal driving FET 425 causes the output voltage of a transformer coupled to FET 425 to decrease. Consequently, the rising voltage (e.g., increasing) applied to Vfb iso prompts the instantiation of circuit processes that result in a falling (e.g., decreasing) voltage to be supplied from the transformer.

In the present embodiment, when the voltage present at Vfb Iso moves low (e.g., lower than it was previously), it causes decreased current to flow through opto-diode 403. The decreased current flow through opto-diode 403 causes decreased current flow in opto-coupler npn transistor 405 to which it is coupled. It should be appreciated that the decreased flow of current through opto-coupler transistor 405 causes a corresponding decrease of current flow in cascode transistor 407. In the embodiment shown in FIG. 4A, as current flow decreases through cascode transistor 407, the voltage at the collector of cascode transistor 407 increases.

The increasing voltage at the collector of the cascode transistor 407 causes the voltage supplied to PWM driver 421 to increase which in turn causes the duty cycle of the switching signal driving FET 425 to increase. It should be appreciated that an increasing duty cycle of the signal driving FET 425 causes the output voltage of a transformer coupled to FET 425 to increase. Consequently, the rising voltage (e.g., increasing) applied to Vfb iso prompts the instantiation of circuit processes that result in a rising (e.g., increasing) voltage in the secondary winding of the transformer to be supplied to Vfb iso from the transformer as a feedback/control voltage.

It should be appreciated that the FIG. 4A embodiment, utilizes a low impedance output op-amp error amplifier 409. As a consequence, feedback resistor 411 and capacitor 413 are employed to help shape the frequency response of the op-amp error amplifier 409 according to one embodiment. In addition, when a low impedance op-amp error amplifier is utilized a pull up current source 415 may be employed. Also shown in FIG. 4A (and in FIG. 4B) is isolation side reference voltage (Vref) and error amplifier opto-driver 490. This device receives the output of transformer 431 as an input and generates the feedback voltage Vfb iso.

Figure 4B:
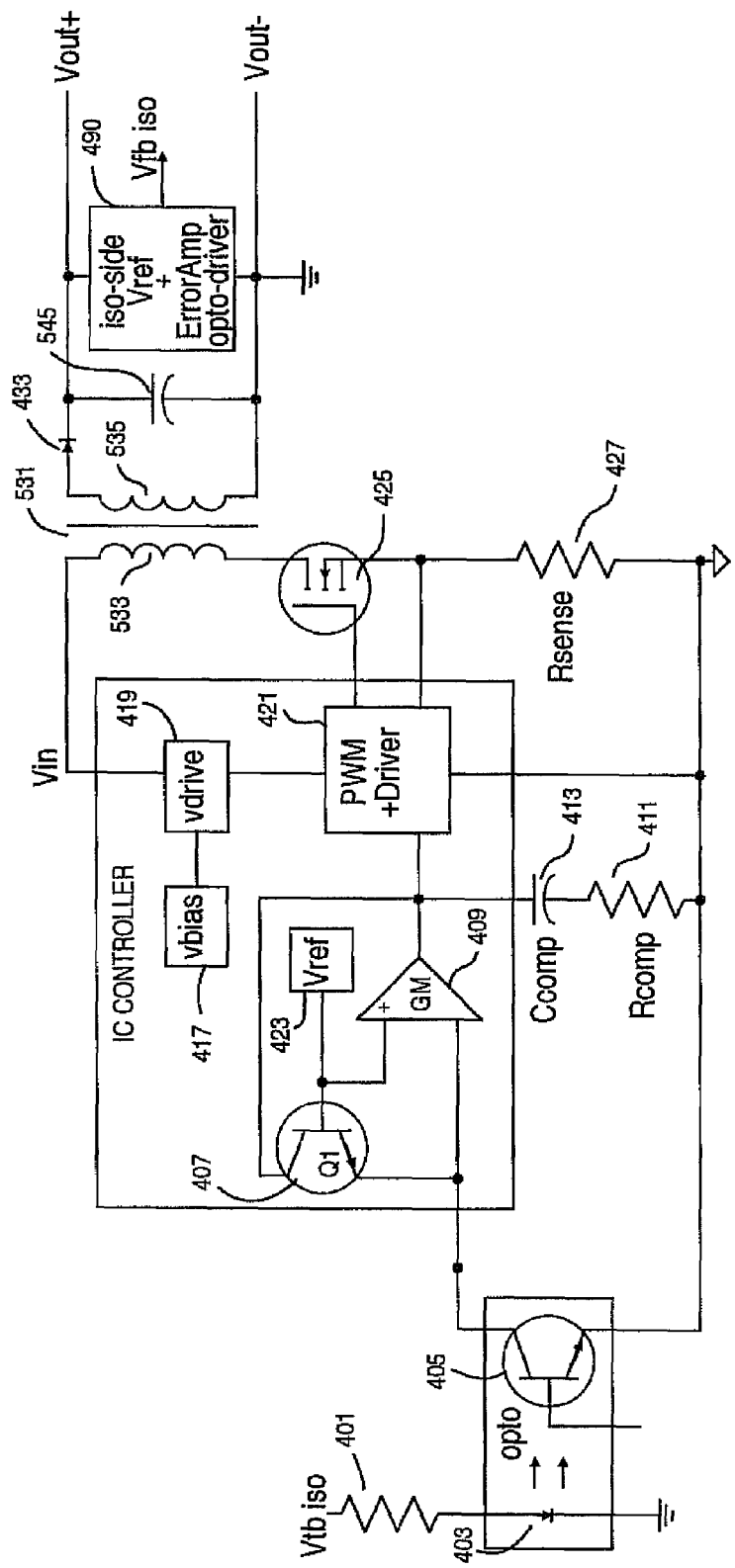
FIG. 4B shows an implementation of an SMPS control system that employs an opto-coupler interface and GM error amplifier according to one embodiment of the present invention.

FIG. 4B shows an implementation of an SMPS control system that employs an opto-coupler interface and GM error amplifier according to one embodiment of the present invention. It should be appreciated that the GM amplifier of FIG. 4B is a high gain high amplifier that exhibits a high impedance at its output terminal. In the FIG. 4B embodiment, feedback components to the inverting input terminal of the GM amplifier may not be employed (as are employed in the FIG. 4A embodiment) because of the high impedance output exhibited by the GM amplifier. However, it should be appreciated that RC (resistor/capacitor) combinations coupled to ground may be employed to shape the frequency response of the GM amplifier. According to one embodiment, in the architectures of both the FIGS. 4A and 4B embodiments, frequency response shaping is performed by the RC combinations (e.g., 411 and 413) although different schemes are employed in the respective embodiments to effect the frequency response shaping.

In some embodiments, an opto-coupler (e.g., 405) may not be employed (see discussions made with reference to FIGS. 6A-7B). In exemplary embodiments, when an opto-coupler is not employed, cascode transistor 407 becomes transparent in the sense that it does not interfere with the operation of error amplifier 409. It should be appreciated that, external feedback resistors are employed in a closed loop circuit configuration when an opto-coupler (e.g., 405) is not used when either an op amp or GM amplifier is employed as the error amplifier.

It should be appreciated, in a closed loop configuration such as that shown in FIG. 4B, the base emitter junction of cascode transistor 407 is biased to nearly zero volts. This prevents the cascode transistor 407 from turning on and allows the error amplifier (e.g., 409) to function as if the cascode transistor (e.g., 407) were not present. Consequently, embodiments of the present invention operate whether or not an opto-coupler is used (e.g., all existing modes).

Figure 5A:
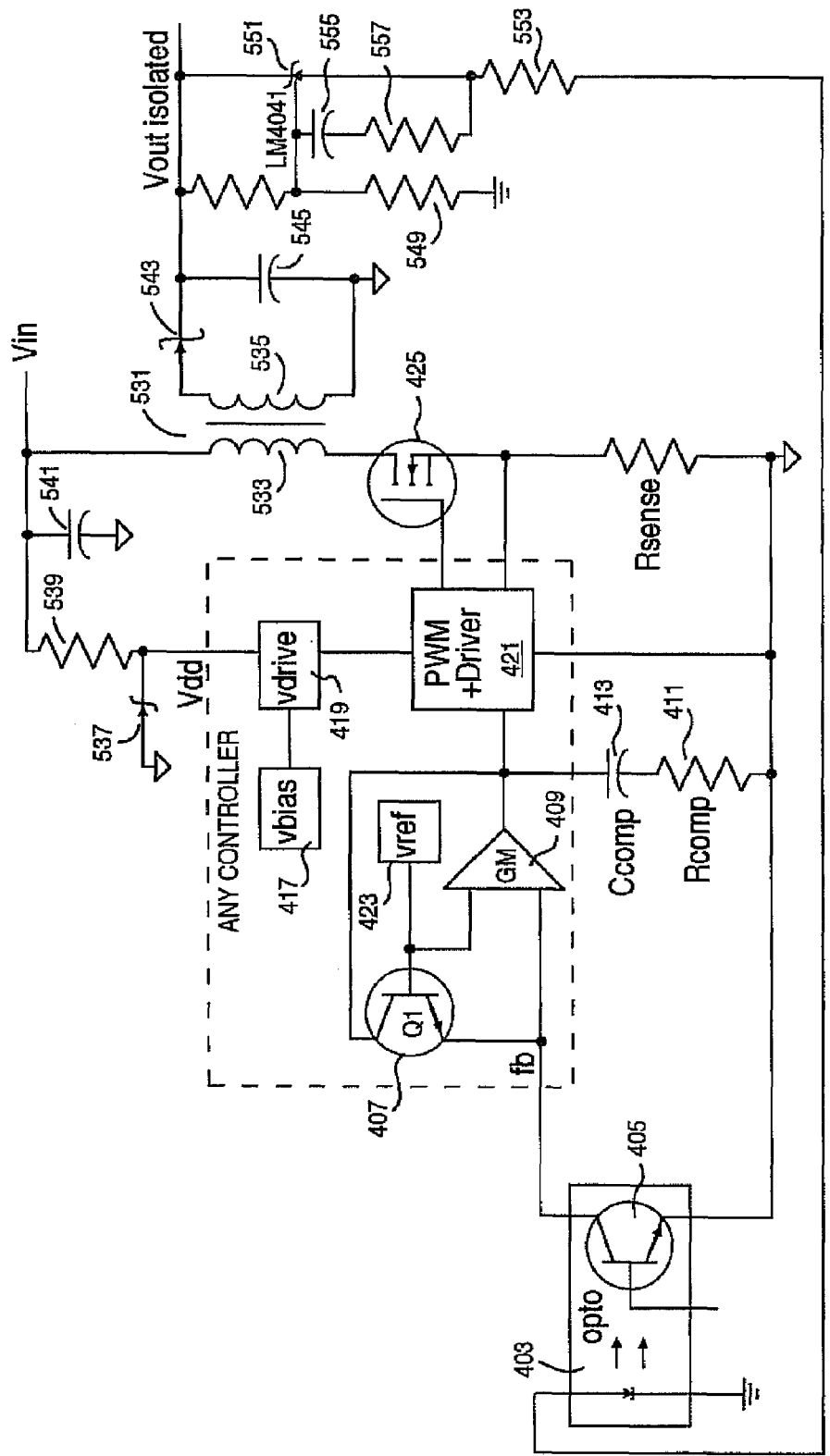
FIG. 5A shows a flyback implementation of an SMPS control system that employs an opto-coupler interface that is present and functional according to one embodiment of the present invention.

FIG. 5A shows a flyback implementation of an SMPS control system that employs an opto-coupler interface that is present and functional according to one embodiment of the present invention. In flyback architectures such as that shown in FIG. 5A, when FET 425 is turned on, no energy flows to the secondary winding of transformer 431. When FET 425 is turned off, energy (e.g., power) stored in the primary winding (e.g., 533) of transformer 531 flows to its secondary winding 535. Consequently, in the FIG. 5A embodiment, there is a time delay (e.g., due to the flyback design) after FET 425 switches before power is transferred to the secondary winding of transformer 531.

As previously discussed, opto-coupler npn-transistor 405 is biased through the operation of cascode transistor 407. As a result, the external parts count is reduced since no Vbias supply or bias resistors are needed to bias the opto-coupler and the opto diode drive need not contain an additional parallel resistor and capacitor to provide a zero to cancel the opto induced pole.

In the FIG. 5A embodiment, when the voltage present at Vfb Iso moves high (e.g., higher than it was previously), it causes increased current to flow through opto-diode 403. The increased current flow through opto-diode 403 causes increased current flow in opto-coupler npn transistor 405 to which it is coupled. It should be appreciated that the increased flow of current through opto-coupler transistor 405 causes a corresponding increase of current flow in cascode transistor 407. In the embodiment shown in FIG. 5A, as current flow increases through cascode transistor 407, the voltage at the collector of the cascode transistor 407 decreases.

The decreasing voltage at the collector of cascode transistor 407 causes the voltage supplied to PWM driver 421 to decrease which in turn causes the duty cycle of the switching signal driving FET 425 to decrease. It should be appreciated that a decreasing duty cycle of the signal driving the FET 425 causes the output voltage of a transformer coupled to FET 425 to decrease. Consequently, the rising voltage (e.g., increasing) applied to Vfb iso prompts the instantiation of circuit processes that result in a falling (e.g., decreasing) voltage to be supplied to Vfb iso from transformer 531.

In the present embodiment, when the voltage present at Vfb Iso moves low (e.g., lower than it was previously), it causes decreased current to flow through opto-diode 403. The decreased current flow through opto-diode 403 causes decreased current flow in opto-coupler npn transistor 405 to which it is coupled. It should be appreciated that the decreased flow of current through opto-coupler transistor 405 causes a corresponding decrease of current flow in cascode transistor 407. In the embodiment shown in FIG. 5A, as current flow decreases through cascode transistor 407, the voltage at the collector of the cascode transistor 407 increases.

The increasing voltage at the collector of cascode transistor 407 causes the voltage supplied to PWM driver 421 to increase which in turn causes the duty cycle of the switching signal driving FET 425 to increase. It should be appreciated that an increasing duty cycle driving FET 425 causes the output voltage of a transformer coupled to FET 425 to increase. Consequently, the falling voltage (e.g., decreasing) applied to Vfb iso prompts the instantiation of circuit processes that result in a rising (e.g., increasing) voltage in the secondary winding 535 of transformer 531 to be supplied to Vfb iso from transformer 531.

Figure 5B:
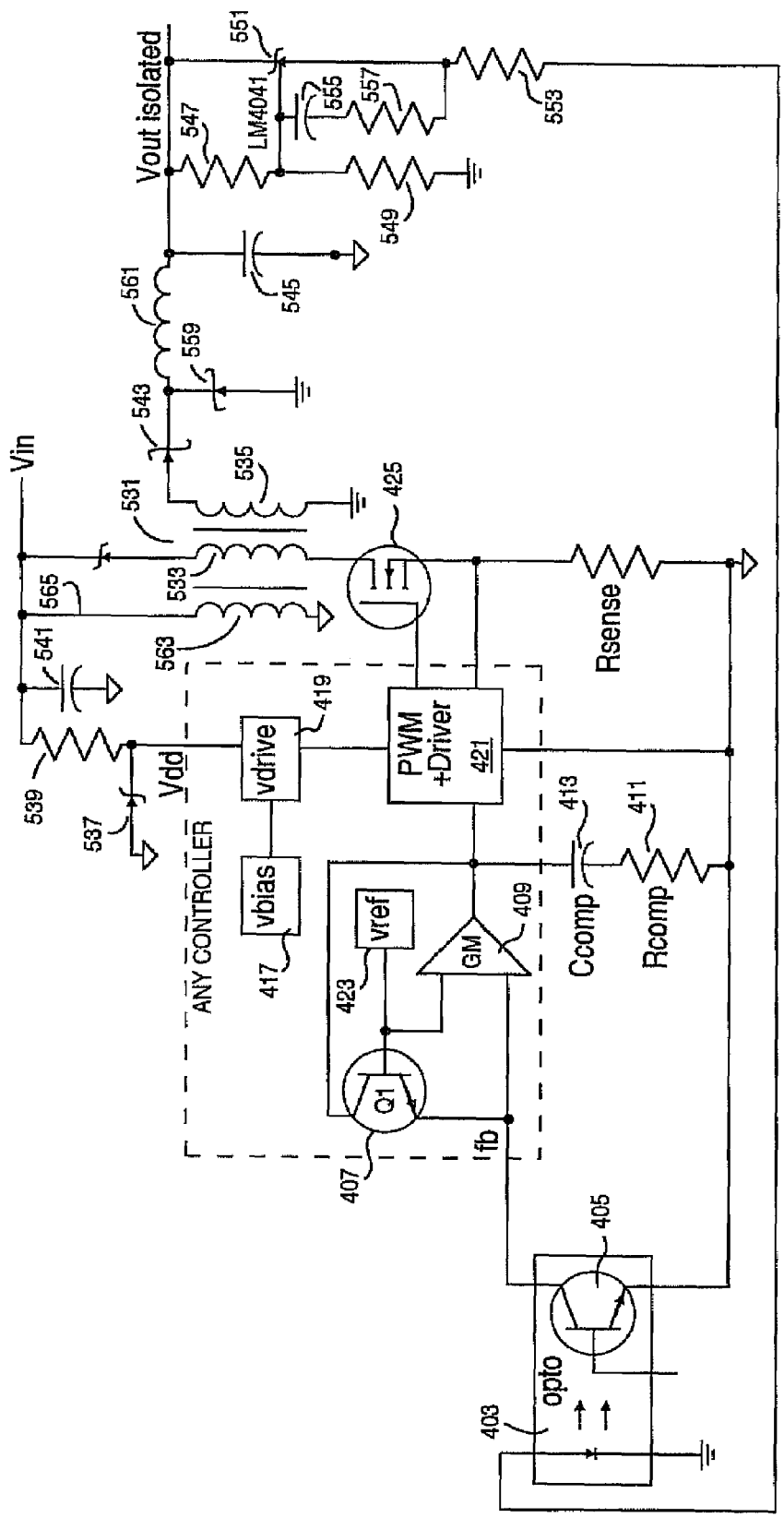
FIG. 5B shows a forward implementation of an SMPS control system that employs an opto-coupler interface that is present and functional according to one embodiment of the present invention.

FIG. 5B shows a forward implementation of an SMPS control system that employs an opto-coupler interface that is present and functional according to one embodiment of the present invention. In forward architectures such as that shown in FIG. 5B, when FET 425 is turned on, energy flows to the secondary winding of transformer 531. When FET 425 is turned off, no energy (e.g., power) flows to the secondary winding 435 of transformer 531. Consequently, in the FIG. 5B embodiment (in contrast to that of FIG. 5A), power begins to be transferred to the secondary winding of transformer 531 when FET 425 is turned on.

Figure 6A:
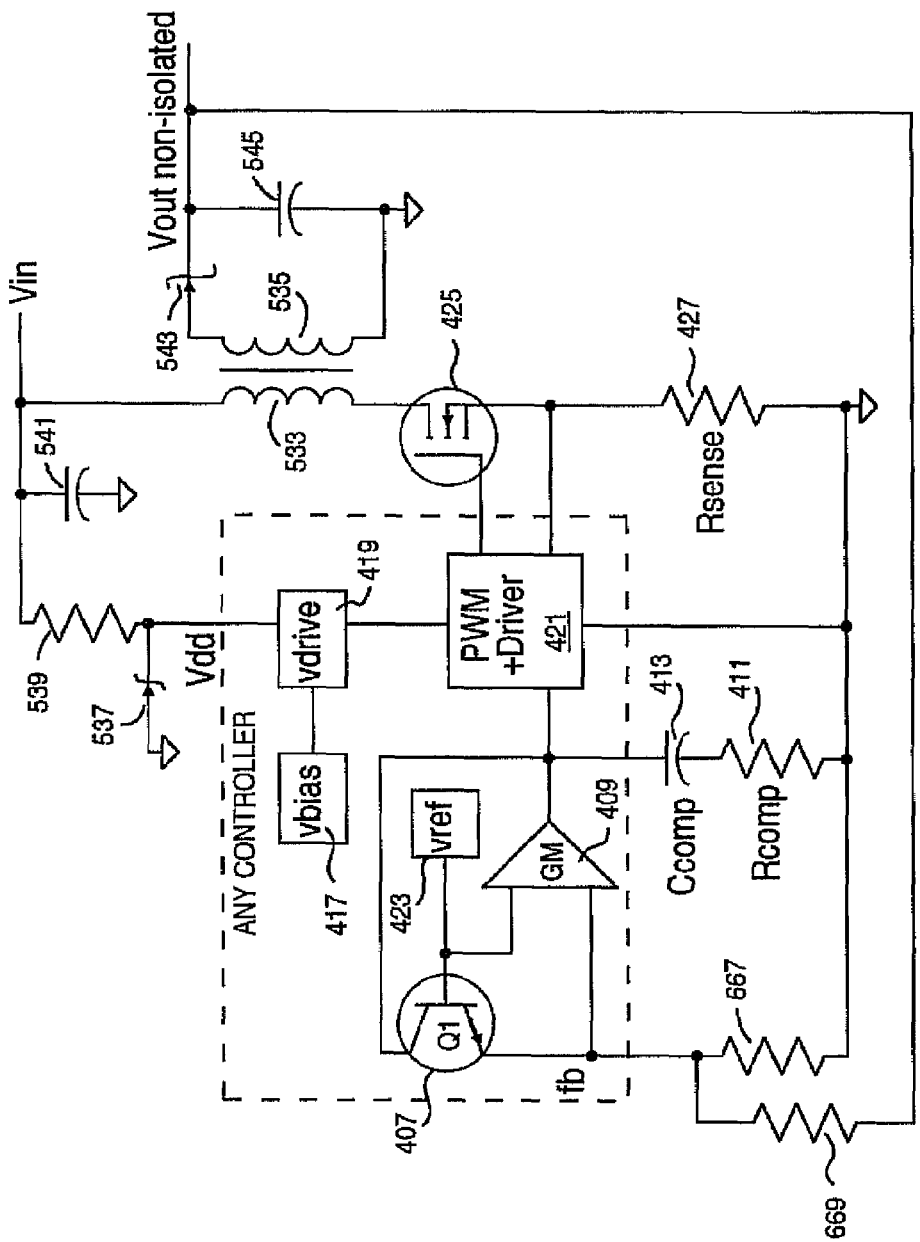
FIG. 6A shows a flyback implementation of an SMPS control system that employs an opto-coupler interface that is present but non-functional according to one embodiment of the present invention.

FIG. 6A shows a flyback implementation of an SMPS control system that employs an opto-coupler interface that is present but non-functional according to one embodiment of the present invention. In exemplary embodiments, when an opto-coupler is not employed, cascode transistor 407 becomes transparent in that it does not interfere with the operation of the error amplifier 409. It should be appreciated that, external feedback resistors (e.g., 667 and 669) are employed in a closed loop circuit configuration when an opto-coupler (e.g., 405) is not used when either an op amp or GM amplifier is employed as the error amplifier.

In flyback architectures such as that shown in FIG. 6A, when FET 425 is turned on, no energy flows to the secondary winding of transformer 431. When FET 425 is turned off, energy (e.g., power) stored in the primary winding (e.g., 433) of transformer 431 flows to its secondary winding 435. Consequently, in the FIG. 6A embodiment, there is a time delay (e.g., due to the flyback design) after FET 425 switches before power is transferred to the secondary winding of transformer 431. It should be appreciated, in a closed loop configuration, the base emitter junction of cascode transistor 407 is biased to nearly zero volts. This prevents cascode transistor 407 from turning on and allows the error amplifier (e.g., 409) to function as if the cascode transistor (e.g., 407) were not present. Consequently, embodiments of the present invention operate equally well whether or not an opto-coupler is used (e.g., all existing modes).

Figure 6B:
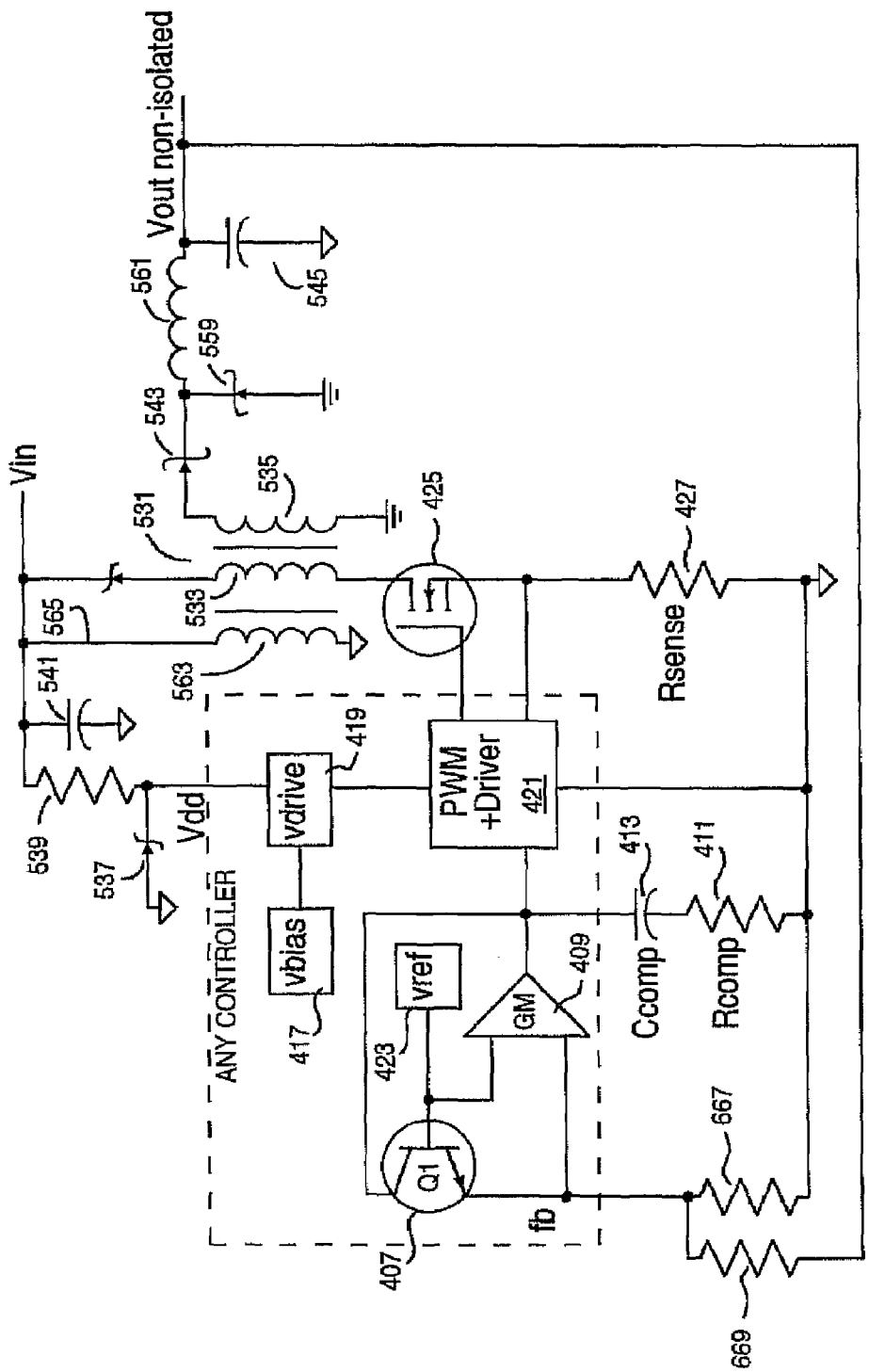
FIG. 6B shows a forward implementation of an SMPS control system that employs an opto-coupler interface that is present but non-functional according to one embodiment of the present invention.

FIG. 6B shows a forward implementation of an SMPS control system that employs an opto-coupler interface that is present but non-functional according to one embodiment of the present invention. In exemplary embodiments, when an opto-coupler is not employed, cascode transistor 407 becomes transparent in that it does not interfere with the operation of the error amplifier. It should be appreciated that, external feedback resistors are employed in a closed loop circuit configuration when an opto-coupler (e.g., 405) is not used when either an op amp or GM amplifier is employed as the error amplifier.

In forward architectures such as that shown in FIG. 6B, when FET 425 is turned on, energy flows to the secondary winding of transformer 531. When FET 425 is turned off, no energy (e.g., power) flows to the secondary winding 535 of transformer 531. Consequently, in the FIG. 6B embodiment (in contrast to that of FIG. 6A), power begins to be transferred to the secondary winding 535 of transformer 531 when FET 225 is turned on.

It should be appreciated, in a closed loop configuration such as that shown in FIG. 6B, the base emitter junction of cascode transistor 407 is biased to nearly zero volts. This prevents cascode transistor 407 from turning on and allows the error amplifier (e.g., 409) to function as if the cascode transistor (e.g., 407) were not present. Consequently, embodiments of the present invention operate equally well whether or not an opto-coupler is used (e.g., all existing modes).

Figure 7A:
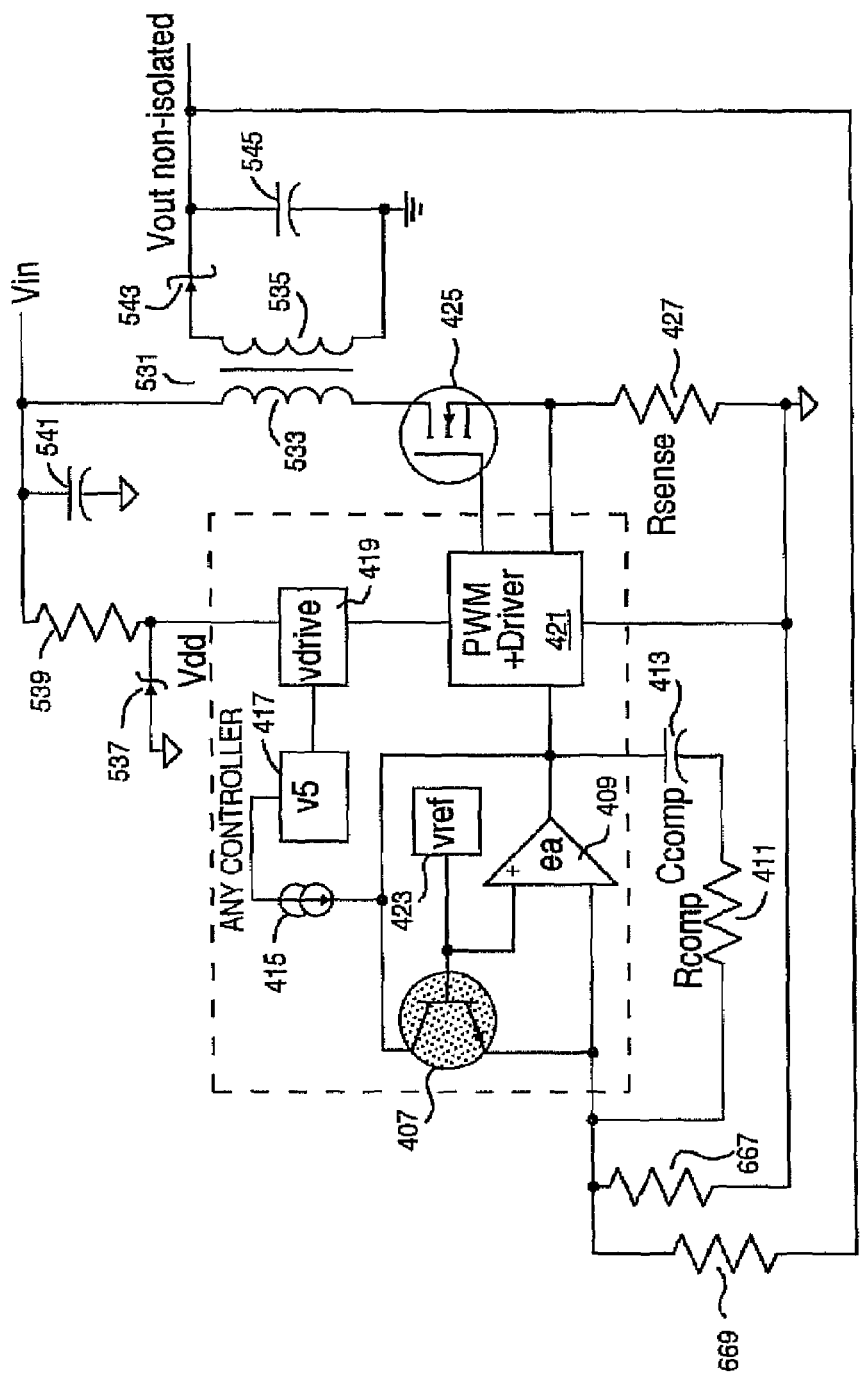
FIG. 7A shows a flyback implementation of an SMPS control system that employs an opto-coupler interface that is present but non-functional according to one embodiment of the present invention.
Figure 7B:
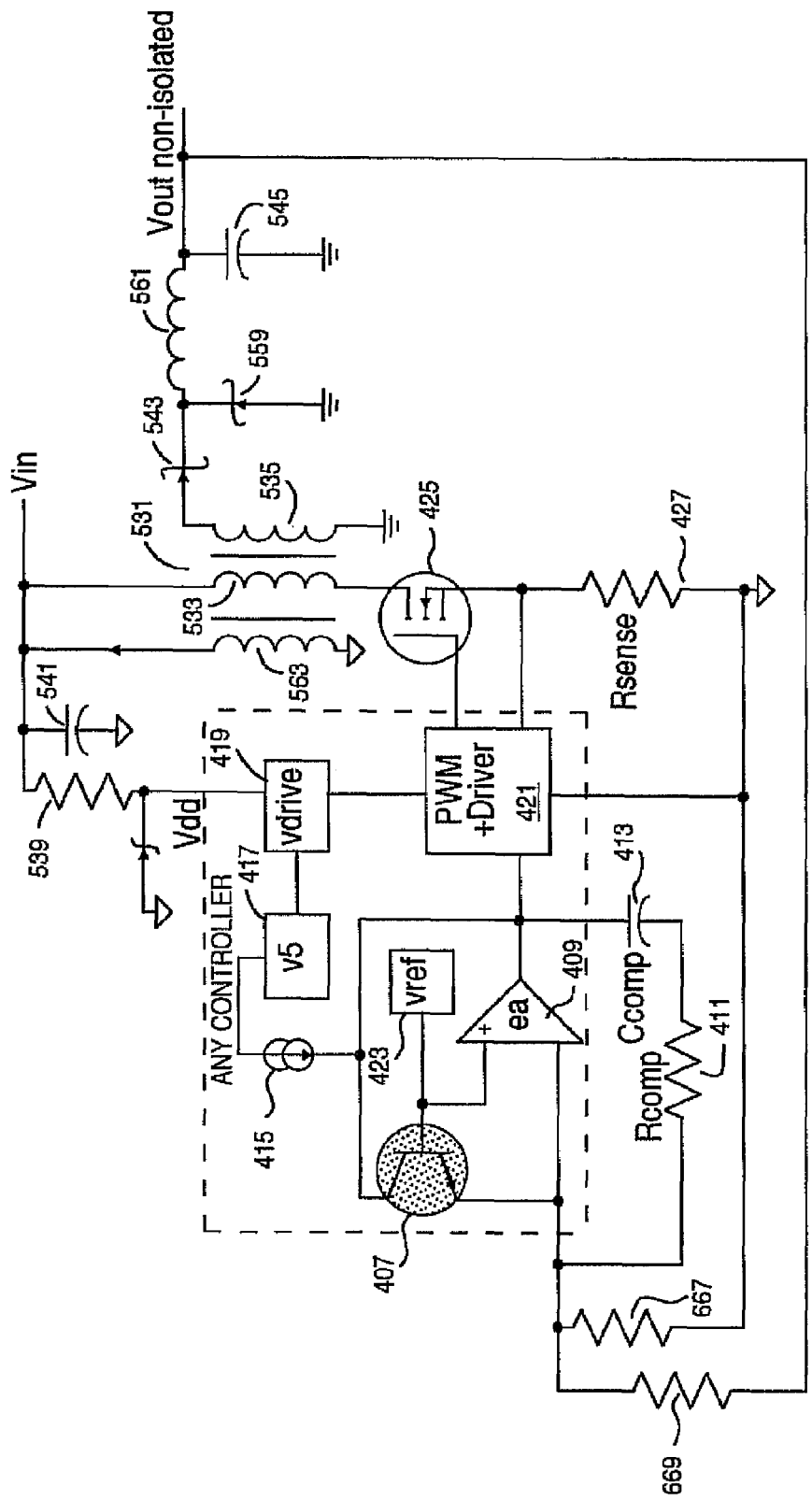
FIG. 7B shows a forward implementation of an SMPS control system that employs an opto-coupler interface that is present but non-functional according to one embodiment of the present invention.

FIG. 7A shows a flyback implementation of an SMPS control system that employs an opto-coupler interface 407 that is present but non-functional and that employs an op-amp error amplifier 409 according to one embodiment of the present invention. FIG. 7B shows a forward implementation of an SMPS control system that employs an opto-coupler interface 407 that is present but nonfunctional and that employs an op-amp error amplifier 409 according to one embodiment of the present invention. The embodiments of FIGS. 7A and 7A operate analogously to those of FIGS. 6A and 6B. However, they feature an error amplifier feedback design that is a consequence of the low impedance output op-amp characteristics as discussed herein with reference to FIG. 4A.

FIGS. 4A-7B show various configurations of exemplary SMPS circuits according to embodiments of the present invention. Also shown in FIGS. 4A-7B are SMPS components 417, 423, 419, 537, 539, 541, 543, 545, 549, 551, 553, 555, and 557.

Figure 8:
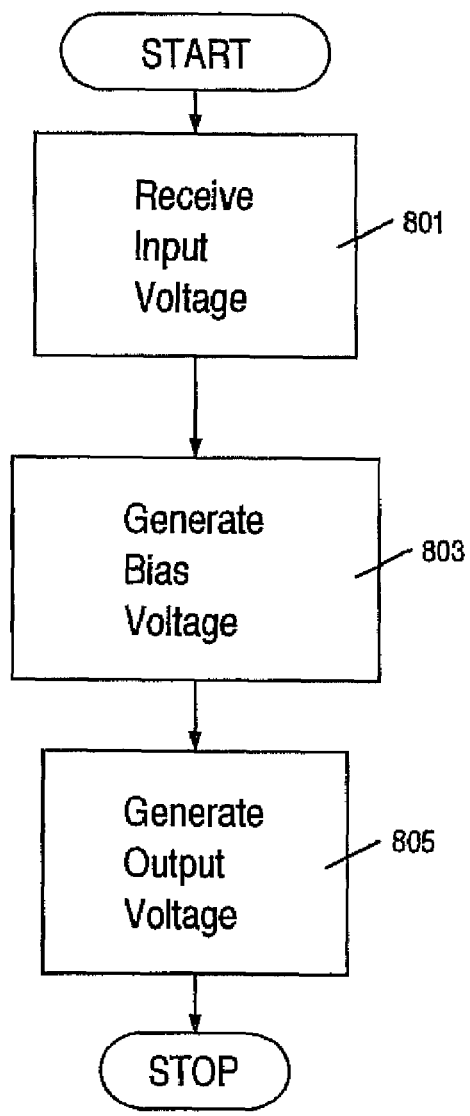
FIG. 8 shows a method for providing a bias voltage for a power input sub-circuit of a switched mode power supply according to one embodiment of the present invention.

FIG. 8 shows a method for providing a bias voltage for a power input sub-circuit of a switched mode power supply according to one embodiment of the present invention. In the present embodiment, an opto-coupler interface that is employed generates a bias voltage for an opto-coupler resident in the power input sub-circuit of the SMPS that eliminates the necessity of providing the bias voltage through the use of additional external parts.

At step 801, an input voltage is received into a power input sub-circuit of a switched mode power supply circuit. At step 803, a bias voltage is generated from a controller sub-circuit of the switched mode power supply that is applied to a terminal of the power input sub-circuit. According to one embodiment, the bias voltage is used to bias an opto-coupler in the power input sub-circuit. At step 805, an output voltage is generated by the controller sub-circuit that drives a switch. According to exemplary embodiments, the switch is coupled to a transformer that constitutes part of a feedback/control loop.

A switched mode power supply (SMPS) is disclosed. The switched mode power supply (SMPS) includes a-controller sub-circuit that generates an output signal that drives a switch. The controller sub-circuit generates a bias voltage for a sub-circuit of the switched mode power supply that is different from the controller sub-circuit when the controller sub-circuit is coupled to the sub-circuit of the switched mode power supply.

The foregoing descriptions of specific embodiments of the present invention have been presented for purposes of illustration and description. They are not intended to be exhaustive or to limit the invention to the precise forms disclosed, and it is evident many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A switched mode power supply (SMPS), comprising:
   an integrated circuit comprising a controller, said controller comprising:
   a voltage reference circuit for generating a reference voltage;
   an error amplifier having a first input coupled with said reference voltage;
   a PWM driver coupled with an output of said error amplifier; and
   a transistor having a base coupled with both said reference voltage and said first input of said error amplifier, a collector coupled with said output of said error amplifier, and an emitter coupled with a second input of said error amplifier, wherein said emitter sources an electrical current to said second input, and wherein said transistor is operable to serve as an opto-coupler interface at said emitter of said transistor.

2. The switched mode power supply as recited in claim 1 further comprising:
   an opto-coupler coupled with said controller at said emitter of said transistor and said second input of said error amplifier, said opto-coupler comprising an opto-transistor that forms a cascode configuration with said transistor of said controller.

3. The switched mode power supply as recited in claim 2 wherein said opto-coupler is biased only by said transistor of said controller and said error amplifier.

4. The switched mode power supply as recited in claim 1 wherein said transistor is cut-off when said SMPS operates without an opto-coupler.

5. A switched mode power supply (SMPS), comprising:
   a controller, comprising:
   a voltage reference circuit for generating a reference voltage;
   an error amplifier having a first input coupled with said reference voltage; and
   a PWM driver coupled with an output of said error amplifier; and
   a transistor having a base coupled with both said reference voltage and said first input of said error amplifier, a collector coupled with said output of said error amplifier, and an emitter directly connected to a second input of said error amplifier; and
   an opto-coupler coupled with said controller at said emitter of said transistor and said second input of said error amplifier.

6. The switched mode power supply as recited in claim 5 wherein said opto-coupler is biased only by said transistor of said controller and said error amplifier.

7. The switched mode power supply as recited in claim 5 wherein said opto-coupler comprises an opto-transistor that forms a cascode configuration with said transistor of said controller.

8. A switched mode power supply (SMPS), comprising:
   a power input sub-circuit;
   an integrated circuit coupled with said power input sub-circuit, said integrated circuit comprising a controller, said controller comprising:
   a voltage reference circuit for generating a reference voltage;
   an error amplifier having a first input coupled with said reference voltage; and
   a PWM driver coupled with an output of said error amplifier; and
   a transistor having a base coupled with both said reference voltage and said first input of said error amplifier, a collector coupled with said output of said error amplifier, and an emitter connected to a second input of said error amplifier, wherein said transistor is disposed within said integrated circuit such that said emitter lies between said collector and said second input and wherein said transistor is operable to serve as an opto-coupler interface at said emitter of said transistor; and
   a power output sub-circuit coupled with said controller.

9. The switched mode power supply as recited in claim 8 wherein said transistor is cut-off when said SMPS operates without an opto-coupler.

10. The switched mode power supply as recited in claim 8 wherein said power input sub-circuit comprises an opto-coupler coupled with said controller at said emitter of said transistor and said second input of said error amplifier.

11. The switched mode power supply as recited in claim 10 wherein said opto-coupler comprises an opto-transistor that forms a cascode configuration with said transistor of said controller.

12. The switched mode power supply as recited in claim 10 wherein said opto-coupler is biased only by said transistor of said controller and said error amplifier.

* * * * *